No. 786,562.

PATENTED APR. 4, 1905.

G. HASSELL.
PHOTOGRAPHIC CAMERA.
APPLICATION FILED JULY 26, 1904.

3 SHEETS—SHEET 1.

WITNESSES:
L. C. Christie.

INVENTOR
Gilbert Hassell.

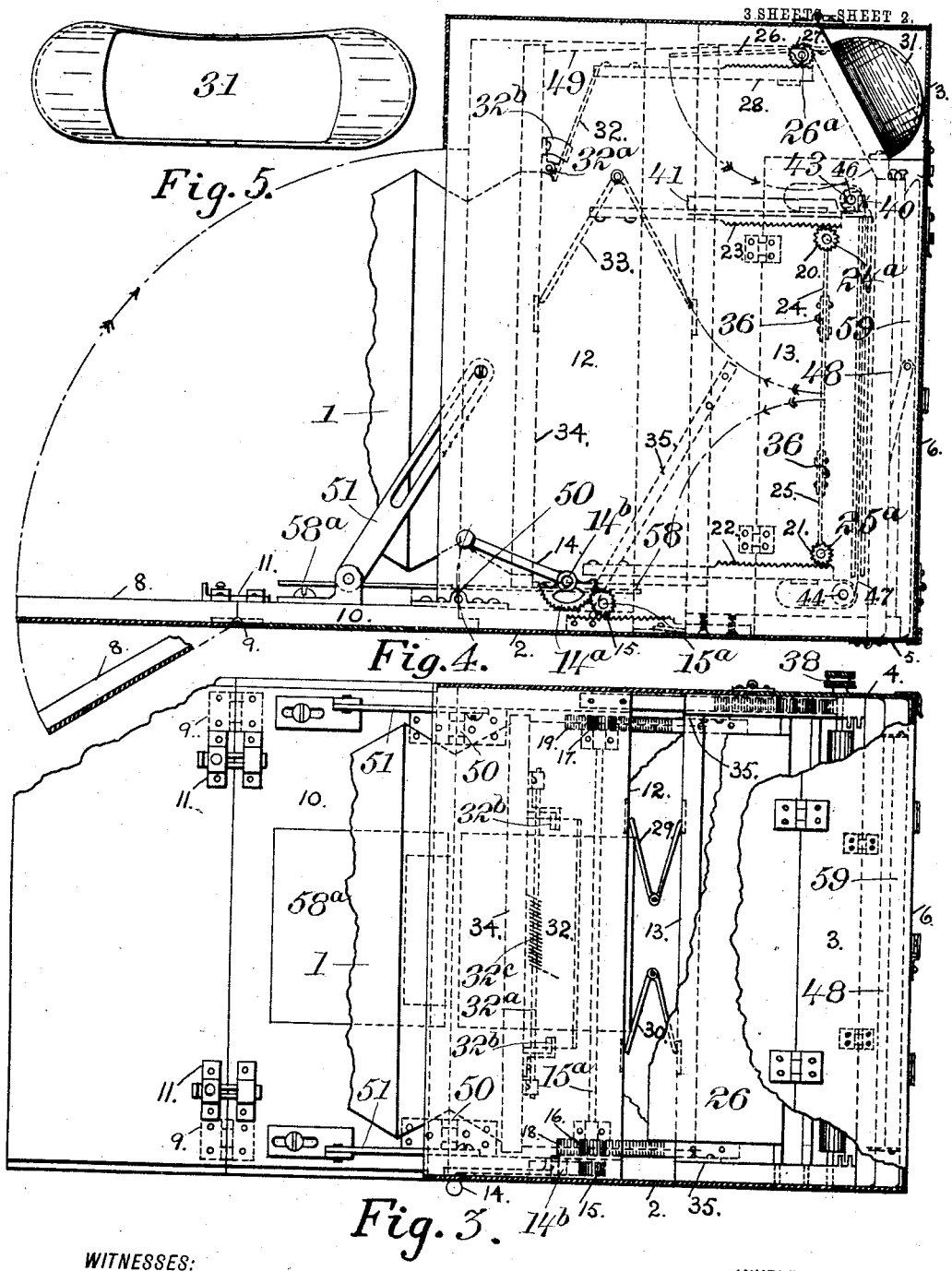

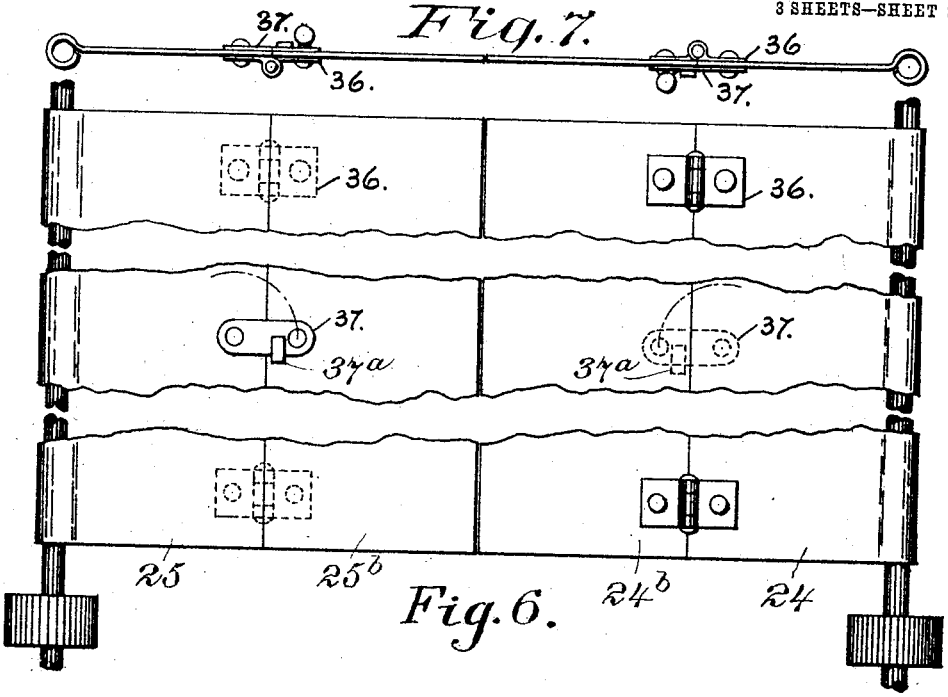

No. 786,562.

Patented April 4, 1905.

UNITED STATES PATENT OFFICE.

GILBERT HASSELL, OF SAN FRANCISCO, CALIFORNIA.

PHOTOGRAPHIC CAMERA.

SPECIFICATION forming part of Letters Patent No. 786,562, dated April 4, 1905.

Application filed July 26, 1904. Serial No. 218,197.

*To all whom it may concern:*

Be it known that I, GILBERT HASSELL, a citizen of the United States of America, and a resident of San Francisco, county of San Francisco, State of California, have invented certain new and useful Improvements in Photographic Cameras, of which the following is a specification.

My invention relates in general to photographic apparatus; and it more specifically consists of an improved form of camera for use in taking photographs.

The object of the invention is to provide a camera-box of smaller size for taking pictures of a given size than any now in use and to produce a readily-convertible camera which may be used either for focusing by means of a mirror or by means of ground-glass plates at the option of the user, also to produce a camera which when the mirror is employed for focusing may be held at the elevation of the eye, and to secure other points of advantage more specifically set forth hereinafter in the specification.

The preferred form of apparatus embodying my invention is illustrated in the accompanying three sheets of drawings, in which—

Figure 1:
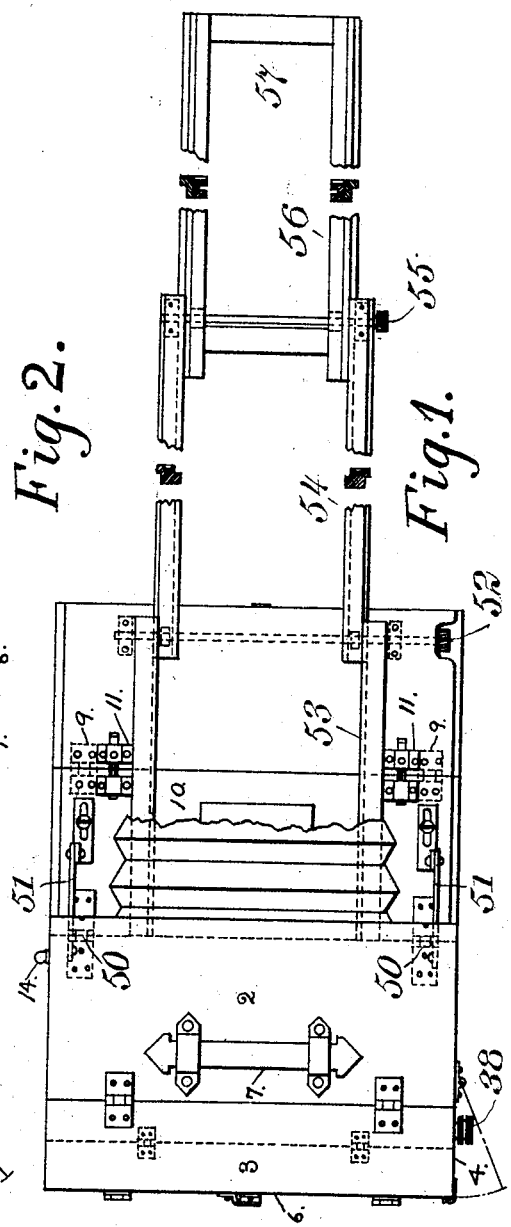
Figure 2:
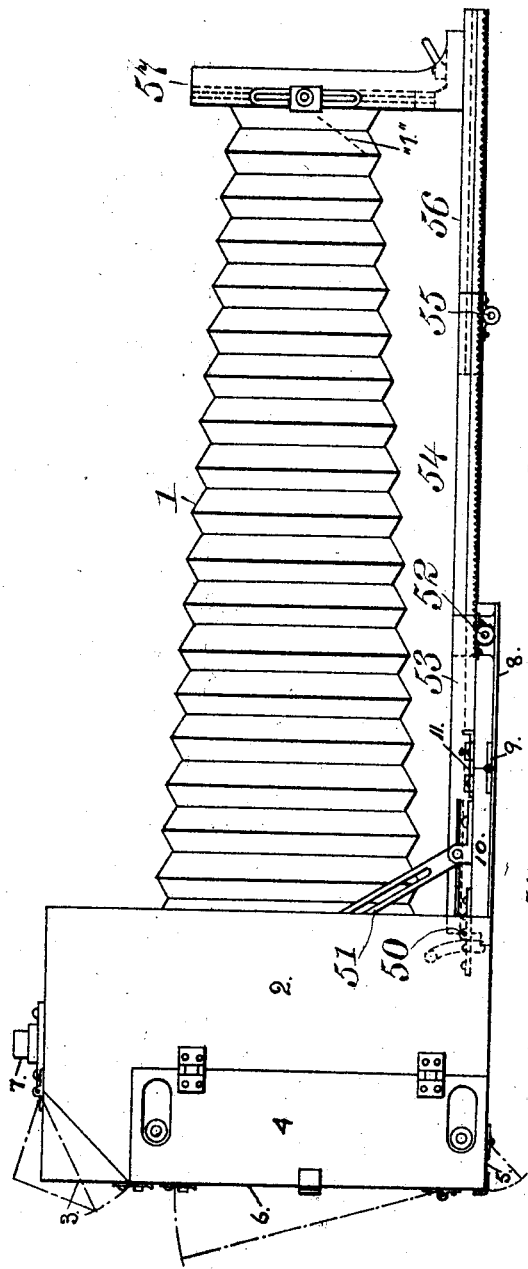

Figure 1 is a side elevation of my improved camera. Fig. 2 is a plan view with parts broken away and with detail cross-sectional views of the extension bed-frame. Fig. 3 is a plan view, with parts broken away, showing the camera-box partly in section and the internal parts thereof in full and dotted lines. Fig. 4 is a vertical section through the camera-box outside of the lining, showing the interior parts. Fig. 5 is a detail view of the eyepiece. Fig. 6 is a detail view of the focusing-plate, parts being broken away; and Fig. 7 is an edge view of the focusing-plate shown in Fig. 6.

Throughout the drawings like reference-figures indicate like parts.

1 represents the usual form of bellows, and 2 the camera-box, which may be made of any metal, such as aluminium, if extreme lightness is desired.

3 is a door at the top of the camera which is to be opened when the mirror focusing device is to be employed.

4 is a side door, and 5 a bottom door through which plate-holders and the reversible back may be admitted.

6 is a door at the rear which may be opened when ground-glass plates are to be used for focusing.

7 is a convenient handle by which the camera may be carried when closed.

The closing-plate or swinging back is composed of the main section 10, hinged to the camera-frame at 50, and a second hinged section 8 is attached to the section 10 by hinges 9 and bolts 11.

12 is a stationary sectional lining for the camera, and 13 is a sliding section in the rear of the stationary section.

14 is an operating-lever pivoted at $14^b$ to the stationary section 12 of the lining and carrying the toothed sector $14^a$, which meshes with pinion 15, keyed on the shaft $15^a$, journaled in the stationary section of the lining 12. This shaft carries pinions 16 and 17, which mesh with rack-bars 18 19, fast on the sliding section 13 of the lining and having their outer projecting ends supported by braces 35 35.

29 and 30 are springs formed of two straight portions of wire connected by a spiral section and located between the fixed section 12 and the sliding section 13 of the camera-lining, tending to hold the same apart, as shown in Fig. 3. These springs lie on the bottom of the box 2 between sections 12 and 13.

24 25 are two focusing-plates mounted on shafts $24^a$ and $25^a$, and which are journaled in the movable section of the lining 13. These plates when swung into line with the lenses form a focusing-screen on which the image is thrown. These shafts carry pinions 20 21, which mesh with rack-bars 22 and 23, which are rigidly mounted on the stationary section 12 and lie against the inside of the box 2. These focusing-plates are each formed in two sections, as shown in detail in Figs. 6 and 7, connected by hinges 36 36 and controlled by locking-pieces 37 37, which engage clips $37^a$ $37^a$ when swung out.

26 is a swinging eyehole-cover mounted on shaft $26^a$, journaled in the sliding section of the lining. This shaft has pinion 27 meshing with rack-bar 28, the other end of which is mounted on the stationary section 12 and lies against the inside of the box 2.

31 is an eye-cover (shown in detail in Fig. 5) placed around the eyeholes.

32 is a focusing-mirror pivoted at $32^a$ on bellows-frame 34 and having its motion limited by the stops $32^b$ $32^b$.

$32^c$ is a spring normally tending to throw the mirror forward into the position shown in Figs. 3 and 4.

34 is the bellows-frame, loosely mounted in the stationary sections of the lining 12, having the rear end of the bellows 1 attached to it, the outer end of said bellows of course being attached to the camera-front 57, which is of the usual construction. The springs 33 33, one of which is shown in Fig. 4, are between the bellows-frame and section 13, lying against the inside of box 2, and tend to force the bellows-frame outward.

The bellows and camera-front when extended are supported by the usual form of extensible rack or bed, composed of the inner section 53, mounted on the swinging section 8 of the closing-plate, the intermediate section 54, and the outer section 56, the several sections being connected together and operated by means of the knob-and-pinion shafts 52 and 55. 47 is a curtain or cloth shutter having an opening therein and wound on the lower roller 44, controlled by a spring in the usual way, while the upper end of said curtain is wound upon a roller 46, controlled by the knob 38. This upper roller may also have the usual ratchet-wheel 43 on it, with which the stop 40 engages, said stop being normally held in engagement by any convenient form of spring. 41 is a projecting portion of the catch 40, arranged to strike the stationary section 12 of the camera-box lining when the movable section 13 is forced up against it.

48 is a plate-holder of the ordinary form.

49 is a cloth extension connecting the movable section 13 of the camera-lining with the bellows-frame 34.

51 51 are slotted braces or stops for the closing-plate or swinging back 10.

58 is a plate fastened to the section 12, and $58^a$ an extension thereof fastened to closing-plate 10. The camera-front 57 may be mounted on these plates when a wide-angle lens is used.

59 is the ordinary ground-glass plate shown in Figs. 3 and 4.

The mode of operation of my invention is as follows: The parts being in the position shown in the drawings, the door 3 is lifted if the focusing-mirror is to be employed and the operator sees the image of the object which is thrown upon the focusing-plates 24 and 25 reflected in the mirror 32 and by manipulating the pinion-shafts 52 55 can so adjust the outer lens carried by the camera-front 57 as to properly focus the image upon the focusing-plates. The moment the focus is obtained and without having to withdraw his eyes from the eyeholes he presses the lever 14, which through the pinion-and-rack mechanism described causes the movable section 13 of the lining to advance until it strikes the stationary section 12. This causes the focusing-plates 24 and 25 to swing, as indicated by the arrows, out of the way and also causes the eyehole-cover 28 to swing down and backward, as indicated by the arrow, to cover the eyehole and shut out all light which might otherwise be admitted there. By the time this is accomplished the plate-holder 48 has been moved up into the same position formerly occupied by the focusing-plates 24 and 25, so that it is focused with exactness for the view to be taken. As the movable section finishes its forward motion and the plate-holder comes into its position the extension 41 of the curtain-catch 40 strikes the stationary section of the camera-box lining, releasing the ratchet-wheel 43, and the spring on the lower roller 44 promptly winds up the curtain 47, including the perforated portion, thereby shutting off all light from the plates in the plate-holder after a momentary exposure of the same. Removal of pressure from the lever 14 permits the springs 29 and 30 to force the movable section of the lining back into its normal position, the plate-holder may be removed and another one substituted, the curtain 47 is wound up by knob 38, and the camera is ready for another operation. When short-focus lenses are to be used, the extensible bed for the bellows may be dropped down out of the way by removing the bolts 11, permitting the section 8 of the closing-plate to turn upon its hinges 9. The front 57 is then slid onto plate 58 or $58^a$. In closing the camera the extensible bed is telescoped upon itself, the camera-front forced into the camera-box, forcing back the bellows-frame 34 against the opposition of the spring 33, and the closing-plate is swung up upon its hinges 50. When a ground-glass plate is to be used for focusing, the hinged portions of the focusing-plates 24 25 are folded back out of the way, the locking-pieces 37 being swung out of engagement with clips $37^a$, the door 3 closed and the door 6 opened, and the camera operated in the usual way.

The swinging extension $24^b$ to the focusing-plate 24 folds on top of the stub portion 24 when the latter is swung up and the extension $25^b$ of the lower plate folds down on top of stub portion 25 when the latter is swung down. Thus they are held in folded positions by gravity.

The advantages of my invention comprise its convenient arrangement of parts and a construction whereby the plate-holder may be automatically moved up into a position formerly occupied by the focusing-plates and the same removed from the line of view and whereby the same camera may be used for focusing by mirror or by the use of ground glass.

Various changes could be made in the details of construction shown without departing from the spirit and scope of my invention so long as the principle of operation of the various parts be retained. Certain of the novel features of my invention might be used while dispensing with others of said features, and various modifications of parts to fit cameras of different sizes and styles will be obvious to those skilled in the art.

Having therefore described my invention, what I claim as new, and desire to protect by Letters Patent, is—

1. In a camera the combination with suitable lenses and their supporting parts of a movable focusing-screen comprising a pair of swinging plates, a movable plate-holder, and means for removing the focusing-screen from the lens-focus and automatically moving the plate-holder into focus.

2. In a camera, a focusing-screen comprising two swinging plates, pivoted one on one side of the focus of the lens and the other on the other side of said focus.

3. In a camera, a focusing-screen comprising two swinging plates, pivoted one on one side of the focus of the lens and the other on the other side of said focus, each of said plates being composed of sections hinged together and means for locking said sections in their extended positions.

4. In a camera, a focusing-screen comprising two swinging plates, pivoted one on one side of the focus of the lens and the other on the other side of said focus combined with a movable plate-holder behind said plates, and means for simultaneously advancing said plate-holder into focus and swinging said plates out of focus.

5. In a camera, the combination of an inclosing casing, a two-part lining therefor, one section fixed in the casing and the other movable, a plate-holder and a focusing-screen carried by the movable section of the lining, means for causing the movable section to approach toward or recede from the fixed section of the lining, and mechanism which removes the focusing-screen from before the plate-holder as the movable section of the lining approaches the fixed section.

6. In a camera, the combination of an inclosing casing, a two-part lining therefor, one section fixed in the casing, and the other movable, a plate-holder and a swinging focusing-screen carried by the movable section of the lining, means for causing the movable section to approach toward or recede from the fixed section of the lining, and mechanism which swings the focusing-screen from before the plate-holder as the movable section of the lining approaches the fixed section, said means comprising a toothed rack on the movable section, a shaft rotating in the fixed section carrying a pinion meshing with said rack and a crank extending outside of the casing for rotating said shaft.

7. In a camera, the combination of an inclosing casing, a two-part lining therefor, one section fixed in the casing, and the other movable, a plate-holder and a swinging focusing-screen carried by the movable section of the lining, means for causing the movable section to approach toward or recede from the fixed section of the lining, and mechanism which swings the focusing-screen from before the plate-holder as the movable section of the lining approaches the fixed section, said mechanism comprising a toothed pinion mounted on the shaft supporting the screen and a toothed rack meshing therewith and mounted on the fixed section of the lining.

8. In a camera, the combination of an inclosing casing, a two-part lining therefor, one section movable and provided with eyeholes, the other section stationary, a swinging cover for said eyeholes, and mechanism which swings the cover into closing position when the movable section of the lining is forced toward the stationary section.

9. In a camera, the combination of an inclosing casing, a two-part lining therefor, one section movable and provided with eyeholes, the other section stationary, a swinging cover for said eyeholes journaled in the movable section, and mechanism which swings the cover into closing position when the movable section of the casing is forced toward the stationary section, together with the bellows-frame projecting into the fixed section of the lining, a cloth extension connecting the movable section with said bellows-frame and springs normally holding the movable and fixed sections apart.

10. In a camera, the combination of an inclosing casing, a two-part lining for said casing, one section located in the rear thereof and being movable and provided with eyeholes in its upper rear portion, the other section located in the forward portion thereof being stationary, a mirror mounted in a forward extension of said movable section, a focusing-screen and plate-holder mounted in the movable section of the lining and means for causing said movable section to approach toward or recede from the fixed section, and mechanism which removes the focusing-screen from before the plate-holder when said movable section is forced up against the fixed section of the lining.

11. In a camera, the combination with the lenses, bellows and bellows-frame of a plate-carrier movable toward and from the lens-focus, a focusing-plate located before the plate-carrier, a flexible opaque extension inclosing the plate-carrier and focusing-plate and extending to the bellows-frame, and means for removing the focusing-plate from the line of focus as the plate-carrier is moved forward into focus.

12. In a camera, the combination with the lenses, bellows and bellows-frame of a plate-carrier movable toward and from the lens-focus, a focusing-plate located before the plate-carrier, a flexible opaque extension inclosing the plate-carrier and focusing-plate and extending to the bellows-frame, and means for removing the focusing-plate from the line of focus as the plate-carrier is moved forward into focus, together with a mirror mounted in the bellows-frame and springs tending to force said bellows-frame away from the movable plate-carrier.

Signed at San Francisco, California, this 20th day of July, 1904.

GILBERT HASSELL.

Witnesses:
 R. H. HIPKINS,
 HENRY PASSAVANT.